(12) United States Patent
Shan

(10) Patent No.: US 9,179,513 B2
(45) Date of Patent: Nov. 3, 2015

(54) LED LIGHTING SYSTEM

(76) Inventor: Xinxin Shan, Edmonton (CA)

( * ) Notice: Subject to any disclaimer, the term of this patent is extended or adjusted under 35 U.S.C. 154(b) by 65 days.

(21) Appl. No.: 14/113,208

(22) PCT Filed: Apr. 19, 2012

(86) PCT No.: PCT/CA2012/050251
§ 371 (c)(1),
(2), (4) Date: Jan. 8, 2014

(87) PCT Pub. No.: WO2012/142710
PCT Pub. Date: Oct. 26, 2012

(65) Prior Publication Data
US 2014/0176009 A1   Jun. 26, 2014

Related U.S. Application Data

(63) Continuation of application No. 13/316,499, filed on Dec. 10, 2011, now Pat. No. 8,791,650, which is a continuation-in-part of application No. 12/278,393, filed as application No. PCT/CA2007/000207 on Feb.
(Continued)

(30) Foreign Application Priority Data

Aug. 1, 2006   (CA) ........................ 255065

(51) Int. Cl.
  *H05B 33/08* (2006.01)
  *H05B 37/02* (2006.01)
  (Continued)

(52) U.S. Cl.
  CPC ........ *H05B 33/0845* (2013.01); *H05B 33/0803* (2013.01); *H05B 33/0884* (2013.01);
  (Continued)

(58) Field of Classification Search
  CPC ............................ H05B 33/0845; H05B 37/02
  USPC ................ 315/291, 159, 246, 185 S, 74, 297; 313/21, 39, 249, 558
  See application file for complete search history.

(56) References Cited

U.S. PATENT DOCUMENTS 5,607,227 A   3/1997   Yasumoto
5,655,830 A   8/1997   Ruskouski
(Continued)

FOREIGN PATENT DOCUMENTS

DE   200 18 865 U1   2/2001
WO   2005/024291 A2   3/2005
(Continued)

OTHER PUBLICATIONS

International Search Report and Written Opinion mailed Aug. 16, 2012, issued in corresponding International Application No. PCT/CA20121050251, filed Apr. 19, 2012, 8 pages.
(Continued)

*Primary Examiner* — Daniel D Chang
(74) *Attorney, Agent, or Firm* — Christensen O'Connor Johnson Kindness PLLC

(57) ABSTRACT

An LED lighting system is provided for connection to a variable power source providing input power, the LED lighting system having at least one power analyzing and processing circuitry connecting to the variable power source, and being configured to identify one or more characteristics of the input power, where the characteristics are selected from amplitude, frequency and pulse width of the input power, compare one or more of the characteristics of the input power to preset control criteria either in hardware or software or both to yield a comparison result, and then control the current control circuitry according to the comparison result.

16 Claims, 6 Drawing Sheets

Related U.S. Application Data 9, 2007, now Pat. No. 8,115,411, which is a continuation-in-part of application No. 11/351,074, filed on Feb. 9, 2006, now Pat. No. 7,307,391.

(60) Provisional application No. 61/476,962, filed on Apr. 19, 2011.

(51) Int. Cl.
  *F21S 4/00* (2006.01)
  *F21V 23/04* (2006.01)
  *F21Y 101/02* (2006.01)
  *F21Y 103/00* (2006.01)
  *F21Y 111/00* (2006.01)
  *F21Y 113/00* (2006.01)
  *F21V 29/507* (2015.01)

(52) U.S. Cl.
  CPC .............. *F21S 4/008* (2013.01); *F21V 23/04* (2013.01); *F21V 29/507* (2015.01); *F21Y 2101/02* (2013.01); *F21Y 2103/003* (2013.01); *F21Y 2111/005* (2013.01); *F21Y 2113/005* (2013.01); *Y02B 20/383* (2013.01); *Y10S 362/80* (2013.01)

(56) References Cited

U.S. PATENT DOCUMENTS

| | | | |
|---|---|---|---|
| 5,785,418 | A | 7/1998 | Hochstein |
| 6,019,493 | A | 2/2000 | Kuo |
| 6,158,882 | A | 12/2000 | Bischoff, Jr. |
| 6,203,180 | B1 | 3/2001 | Fleischmann |
| 6,238,075 | B1 | 5/2001 | Dealey, Jr. |
| 6,283,612 | B1 | 9/2001 | Hunter |
| 6,340,868 | B1 | 1/2002 | Lys |
| 6,388,393 | B1 | 5/2002 | Illingworth |
| 6,472,823 | B2 | 10/2002 | Yen |
| 6,583,550 | B2 | 6/2003 | Iwasa |
| 6,590,343 | B2 | 7/2003 | Pederson |
| 6,725,598 | B2 | 4/2004 | Yoneda |
| 6,860,628 | B2 | 3/2005 | Robertson |
| 6,871,981 | B2 | 3/2005 | Alexanderson |
| 6,936,968 | B2 | 8/2005 | Cross |
| 6,957,905 | B1 | 10/2005 | Pritchard |
| 6,963,175 | B2 | 11/2005 | Archenhold |
| 7,014,336 | B1 | 3/2006 | Ducharme |
| 7,014,337 | B2 | 3/2006 | Chen |
| 7,049,761 | B2 | 5/2006 | Timmermans |
| 7,164,235 | B2 | 1/2007 | Ito |
| 7,202,613 | B2 | 4/2007 | Morgan |
| 7,204,615 | B2 | 4/2007 | Arik |
| 7,220,018 | B2 | 5/2007 | Crabb |
| 7,355,523 | B2 | 4/2008 | Sid |
| 7,510,299 | B2 | 3/2009 | Timmermans |
| 7,815,338 | B2 | 10/2010 | Siemiet |
| 2003/0048641 | A1 | 3/2003 | Alexanderson |
| 2004/0105264 | A1 | 6/2004 | Spero |
| 2005/0135104 | A1 | 6/2005 | Crabb |
| 2005/0162093 | A1 | 7/2005 | Timmermans |
| 2005/0168985 | A1 | 8/2005 | Chen |
| 2005/0190553 | A1 | 9/2005 | Lynch |
| 2005/0265019 | A1 | 12/2005 | Sommers |
| 2005/0281030 | A1 | 12/2005 | Leong |
| 2006/0193131 | A1* | 8/2006 | McGrath et al. .............. 362/227 |
| 2007/0228999 | A1 | 10/2007 | Kit |
| 2009/0058317 | A1 | 3/2009 | Tsai |
| 2009/0079360 | A1 | 3/2009 | Shteynberg |
| 2009/0322234 | A1* | 12/2009 | Chen et al. .................... 315/159 |
| 2010/0060171 | A1* | 3/2010 | Goitiandia et al. ........... 315/152 |
| 2010/0181925 | A1 | 7/2010 | Ivey |
| 2010/0320927 | A1 | 12/2010 | Gray |
| 2012/0299480 | A1 | 11/2012 | Peting |

FOREIGN PATENT DOCUMENTS

| | | |
|---|---|---|
| WO | 2005/031860 A2 | 4/2005 |
| WO | 2009/154321 A1 | 12/2009 |

OTHER PUBLICATIONS

Escobar, J., "Light Emitting Diodes: Gaining visibility in the aviation world," Aircraft Maintenance Technology (Online) <http://www.amtonline.com/publication/article.jsp?pubId=1&id=1585> [retrieved Jan. 28, 2006].

Extended European Search Report mailed Jul. 1, 2010, issued in European Patent Application No. EP 07 71 0621, filed Feb. 9, 2007, 9 pages.

International Search Report and Written Opinion mailed Aug. 16, 2012, issued in International Application No. PCT/CA2012/050251, filed Apr. 19, 2012, 8 pages.

"LED Lighting," EMTEQ Lighting Online Product Information, <http://www.emteq.com/led_intro.html> [retrieved Jan. 28, 2006].

Service, R.F., "Organic LEDs Look Forward to a Bright, White Future," Science Magazine 310:1762-1763, Dec. 16, 2005.

\* cited by examiner

US 9,179,513 B2

LED LIGHTING SYSTEM

CROSS-REFERENCE TO RELATED APPLICATIONS

This application claims the benefit under 35 USC 119(e) of U.S. provisional application No. 61/476,962 filed Apr. 19, 2011.

TECHNICAL FIELD

LED lighting control.

BACKGROUND

Traditionally to control LED lights a control signal has to be provided to the lights either through a separated control pin or wire, or wireless technology, or technologies like signal carrier, or the LED lights operate in a master-slave mode. When the LED lights work in master-slave mode the LED arrays are controlled by the power source directly. For example the power source's voltage is applied to the LEDs directly, so the LEDs are lit up when the voltage goes up and dim down when the voltage goes down. An example LED Lighting System is shown in published international application WO200709092.

SUMMARY

In an embodiment, an LED lighting system is provided for connection to a variable power source providing input power, the LED lighting system having power control circuitry that in operation connects to the variable power source, and the power control circuitry being configured to compare input power to one or more pre-set conditions to yield a comparison result and output a control signal according to the comparison result. The output signal may be applied to a control circuit to control power provided to the at least one LED array according to the comparison result. The pre-set conditions may be selected from amplitude, frequency and pulse width of the input power. In a further embodiment, there is provided a method of controlling an LED lighting system, comprising comparing input power to one or more pre-set conditions using power control circuitry to yield a comparison result; and the power control circuitry outputting a control signal according to the comparison result. The output signal may be applied to a control circuit to control power provided to an array of LEDs according to the comparison result.

In various embodiments, controlling the power provided to the LEDs comprises adjusting brightness, such as brightening or dimming, and different LEDs may be adjusted differently, so that for example some LEDs may be brightened and some dimmed.

BRIEF DESCRIPTION OF THE DRAWINGS

There will now be described embodiments of an LED lighting system, with reference to the drawings, by way of illustration only, in which like numerals denote elements of the same type but may be different examples of the same type depending on the figure, and in which.

DETAILED DESCRIPTION

In this patent document, "comprising" means "including". In addition, a reference to an element by the indefinite article "a" does not exclude the possibility that more than one of the element is present. Each one of the individual features described here may be used in one or more embodiments and is not, by virtue only of being described here, to be construed as essential to all embodiments as defined by the claims.

Figure 1:
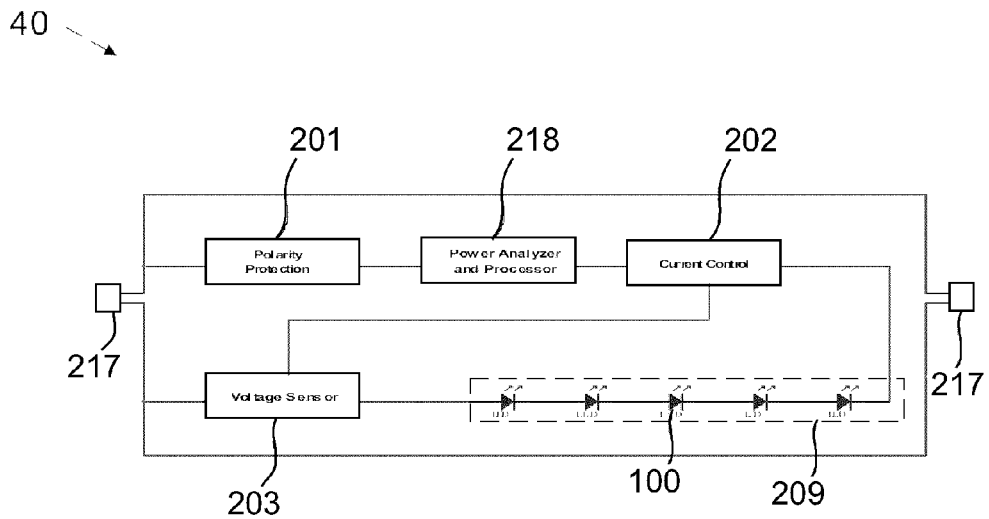
FIG. 1 is a block diagram of the main structure of an LED lighting system, which has a 2-wire power source and power analyzing and processing circuitry.

FIG. 1 illustrates the main structure of a LED lighting system connected to a 2-wire power source 217. A polarity protection circuit 201 of conventional design safeguards against the user installing the product in the wrong polarity. The power source 217 may be AC or DC, and may be a variable or adjustable power source. The characteristics of the power source 217, such as voltage amplitude, power frequency and pulse width, can be adjusted (varied), such as by operation of a switch (not shown) operating on the power source 217. The power analyzer and processor 218, current control 202, polarity protection 201 (if present) and voltage sensor 203 together comprise power control circuitry for the LEDs 100. A single power control circuitry may control one or more arrays 209, through one or more current controls 202 or there may be provided multiple power control circuits and multiple LED arrays, each power control circuit being supplied for a corresponding LED array.

A power analyzer and processor 218 connects to the power source 217 and analyzes the characteristics of power source 217 such as the voltage amplitude, power frequency and pulse width. Then the power analyzer and processor 218 compares one or all of these characteristics to preset control criteria, which may be realized by hardware or software or both. According to the comparison results, the power analyzer and processor 218 controls the current control circuit 202 to adjust the function of LED arrays 209.

Figure 1A:
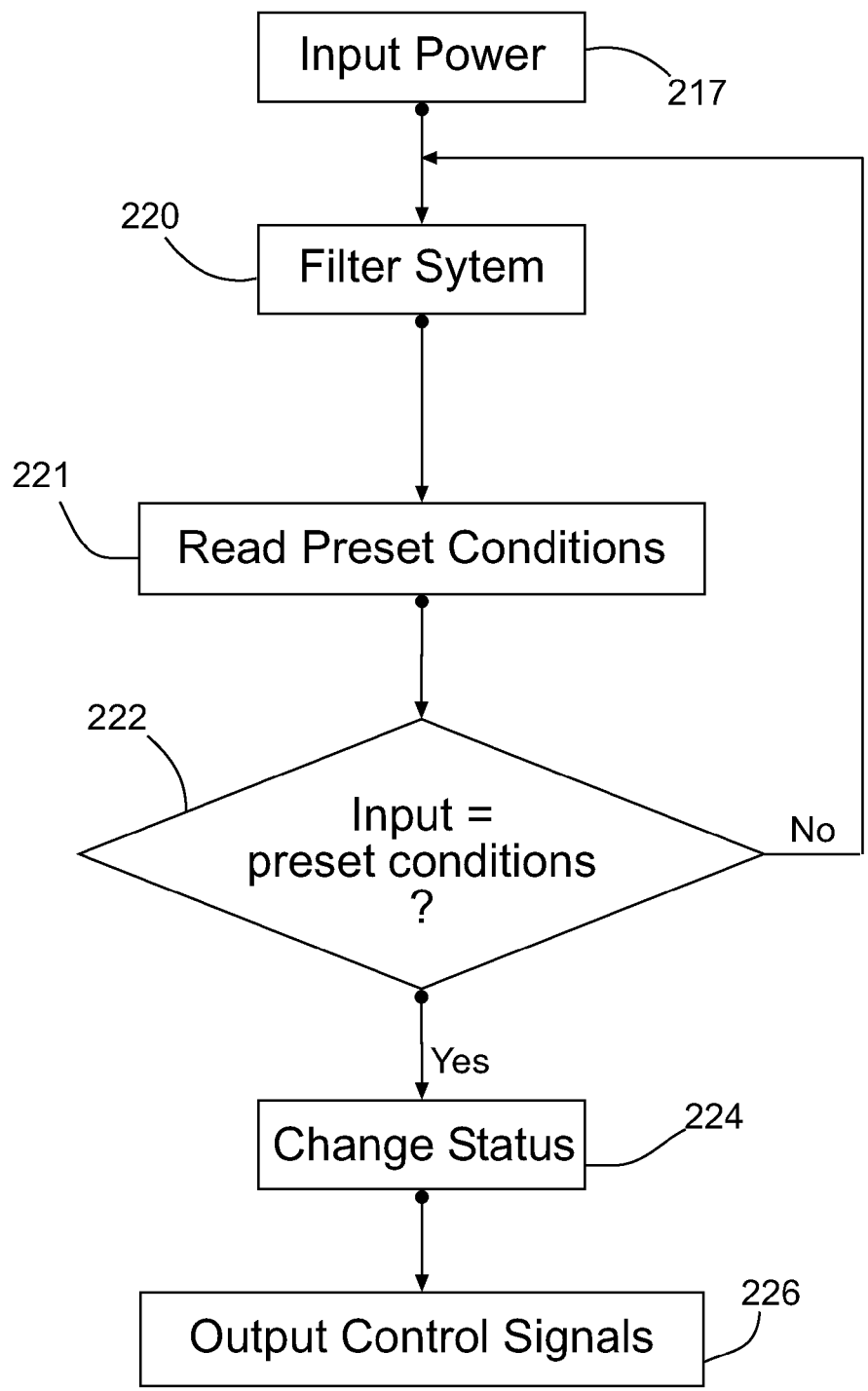
FIG. 1A is a process control diagram illustrating the operation of power analyzing and processing circuitry.
Figure 3:
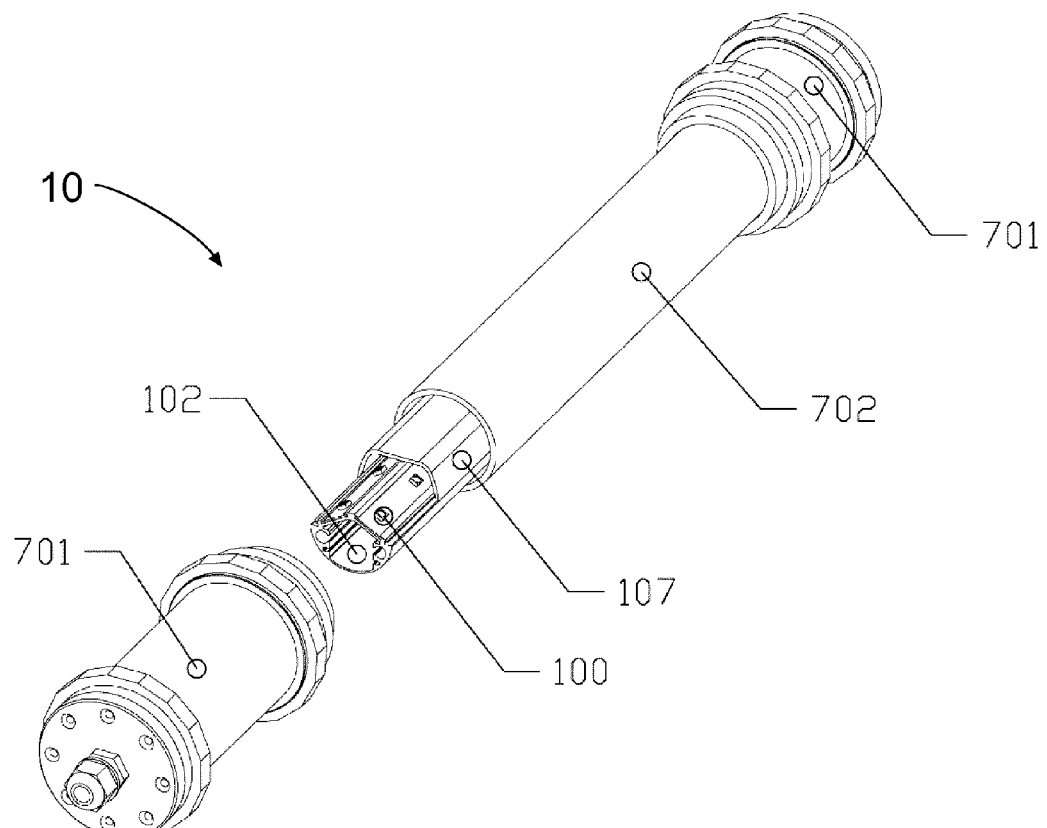
FIG. 3 is a 3-D view of a LED lighting system with two handles and 2 rows of LEDs.

Referring to FIG. 1A, an example of the functions carried out by the processor 218 or power control circuitry is shown. The processor 218 may be a semiconductor circuit configured by software or firmware or may be hardwired. It is preferred that the processor 218 be programmable for maximum flexibility. Input power 217 is supplied to a filter 220. The filter 220 smoothes the incoming power. The incoming power may be AC or DC and may have irregularities imposed on the signal that may be removed by a low pass filter. The processor 218 is provided with one or more pre-set conditions that are stored in memory, not necessarily in memory integrated with the processor 218 but on some accessible storage. The conditions may be for example in the case of an incoming sine wave, a loss of signal or zero signal for a defined period, such as 200 milliseconds. In another example, a change in DC voltage level may be a pre-set condition. In another example, a change in frequency may be a pre-set condition. In another example, a change in pulse width may be a pre-set condition. Any detectable power change may be used as a pre-set condition. After filtering in step 220, the processor 218 reads the pre-set conditions at 221 and compares the pre-set conditions at step 222 with the filtered input. If the filtered input satisfies the conditions (for example a zero signal for 200 ms), then the processor 218 changes state such as from a passive state to an active state in step 224 and outputs a control signal at step 226 to the current control circuit 202. The control signal may instruct the current control circuit 202 for example to increase power supplied to the LEDs 100 (brighten) or decrease the power (dim) the LEDs, or carry out other functions such as turn off or on some but not others of the LEDs or cause a change of color of the LEDs by turning on or off different colored LEDs. The processor 218 preferably may take as input a signal of any frequency, for example 50 Hz, 60 Hz or 100 Hz to provide greatest flexibility in application. Various methods of controlling current may be used and the current control may take various forms, such as disclosed in international publication number WO200709092 published Aug. 16, 2007. The LED lighting system may be constructed in various ways, such as shown in FIGS. 2-7, or in some embodiments as constructed in international publication number WO200709092, the disclosure of which is hereby incorporated by reference where permitted by law.

This method is different from the common ways used for the LED lighting control. Traditionally to control the LED lights a control signal has to be provided to the lights either through a separated control pin or wire, or wireless technology, or technologies like signal carrier, or the technology in a master-slave mode. When the LED lights work in master-slave mode the LED arrays are controlled by the power source directly. For example the power source's voltage is applied to the LEDs directly, so the LEDs are lit up when the voltage goes up and dim down when the voltage goes down. In the disclosed embodiment, the power source is not applied to the LEDs directly. The power source's characteristics, such as voltage amplitude, will be compared to the preset value. The light is controlled according to the comparison results. It is possible the light is lit up when the input voltage goes down, which is totally different from the traditional way. In this way the LED lights can be more conveniently controlled by controlling the characteristics of the power source.

As shown in FIG. 1, the LED array is divided into multiple sets 209 of LEDs (only one is shown), for example five LEDs 100 per set. The current control circuitry 202 is configured to provide constant current to the LEDs 100 of the LED array 209. As an example, the current control circuit 202 may use pulse width modulation (PWM) to control the current supplied to the LEDs. The circuit 202 supplies constant, controlled, current to unit for the entire LED set 209 with information from voltage sensor 203. The voltage sensor 203 receives current information from LEDs 209 and feeds back information to the current control circuitry 202. For example, in the use of PWM, the voltage sensor 203 converts the current of LED array 209 to voltage signal and supplies the voltage signal to the current control circuit 202. The current control circuit 202 senses how much the detected voltage varies from the desire varying the pulse width or frequency, changes the current supplied to the LEDs towards the desired level.

Figure 2:
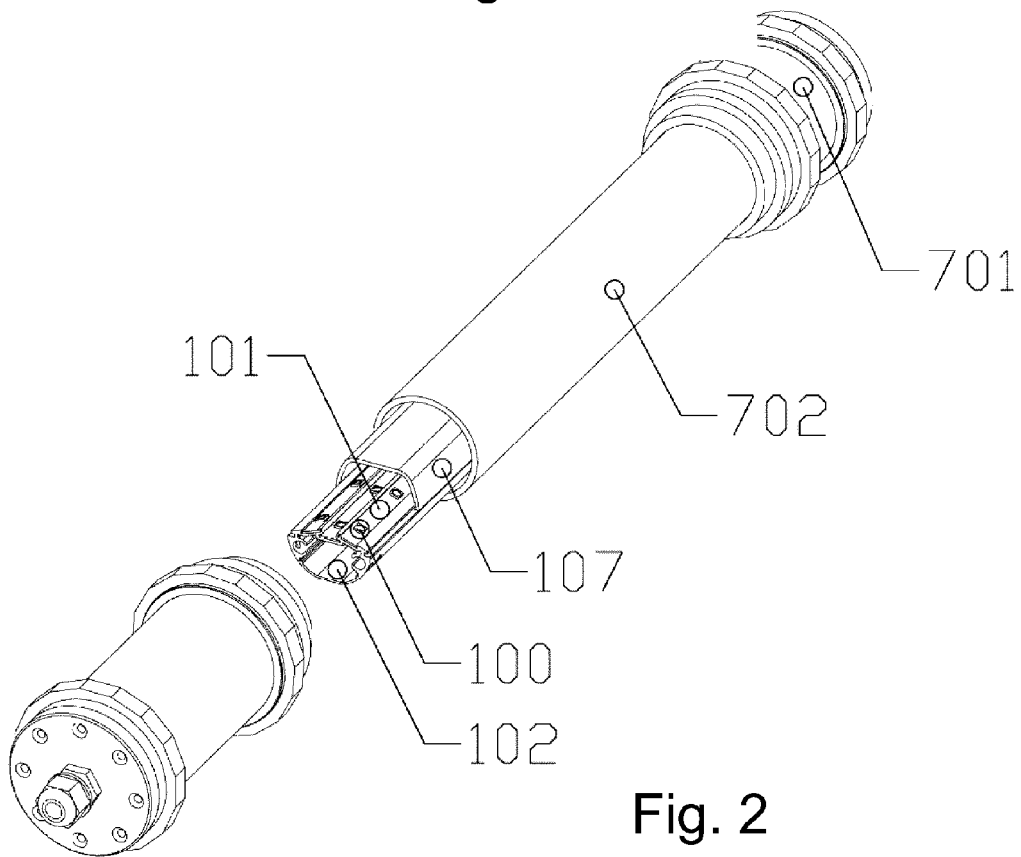
FIG. 2 is a 3-D view of a LED lighting system with two handles and 3 rows of LEDs.

FIG. 2 shows an embodiment of an LED lighting system 10 with two handles 701 spanning between respective ends of a housing 102. Handles 701 are made of metal and/or plastic materials to help heat dissipation and reduce shock and vibration. Circuit boards 101 carrying the LEDs 100 are installed on the housing 102 for example being received in longitudinal slots that face inward and run along the length of the housing 102. The power control circuit 218 may be incorporated on the circuit boards 101 or on separate circuit boards (not shown) installed in the housing. The housing 102 is preferably made of heat conductive and rigid material and spans between the two handles 701. The housing (support structure) or at least the relevant parts that are in contact with the LEDs is sufficiently heat conductive to provide heat dissipation for the LEDs. Cover lens 107 is mounted on the housing 102, for example having inward directed edges that are received in outward facing slots running along the housing 102. The cover lens 107 may be transparent or translucent. External lens 702 is a tube made of various materials such as Polycarbonate and may be held in place by the handles 701. Mostly the external lens 702 is clear. It is used to provide water proof and/or anti-explosion features. In this embodiment three rows of LEDs 100 are installed at different angles to provide wider viewing angle. Each row of the LEDs 100 might have different colors, which can be turned on at the same time or individually to provide desired features. In another embodiment, shown in FIG. 3, the shape of the housing 102 can be changed to hold one or two rows of LEDs 100 to provide different angles and functions.

Figure 4:
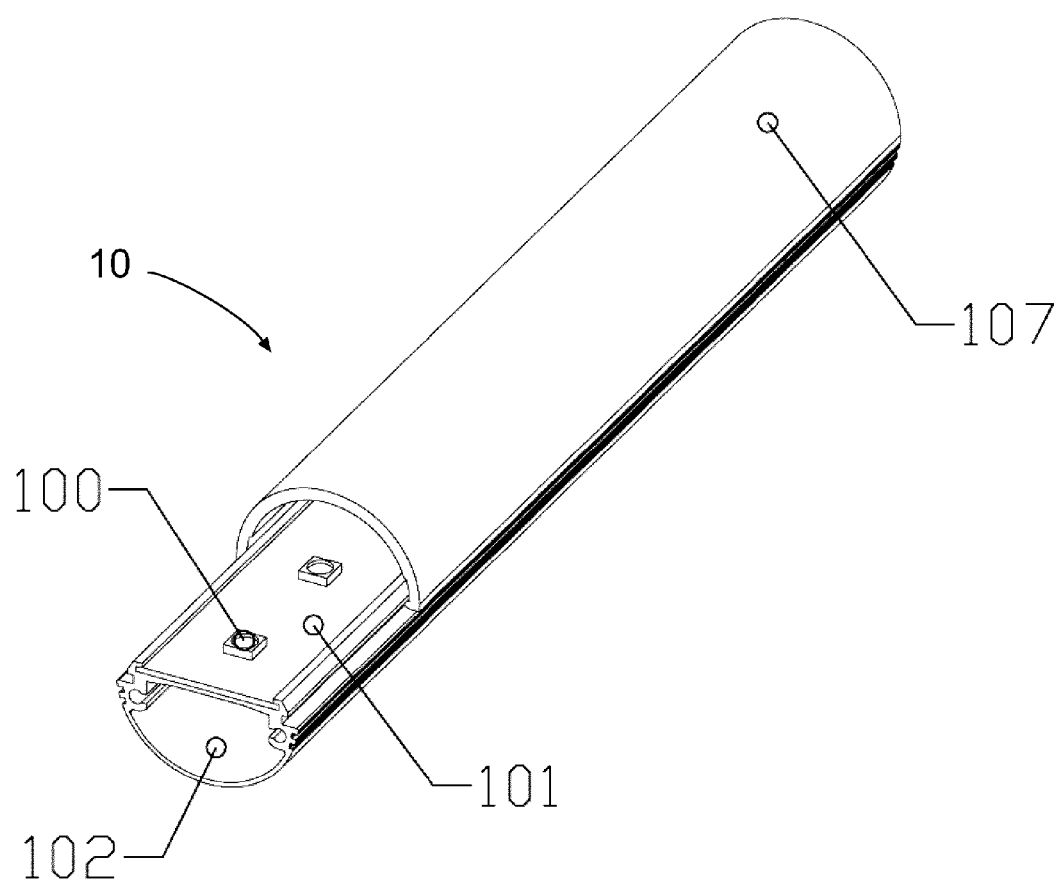
FIG. 4 is a 3-D view of a tube LED lighting system, without end fitting.

FIG. 4 shows a tube embodiment of an LED lighting system 10. The housing 102 is made of heat conductive material. The cross section of the housing 102 is a closed half circle. The circuit boards 101 with LEDs 100 are installed on the housing 102. The housing 102 helps to dissipate the heat from the circuit board 101. The cover lens 107 is in a shape of half circle to be mounted on the housing 102 with inward facing edges received in outward facing slots of the housing 102. The whole assembly forms a tube like a traditional fluorescent light.

Figure 5:
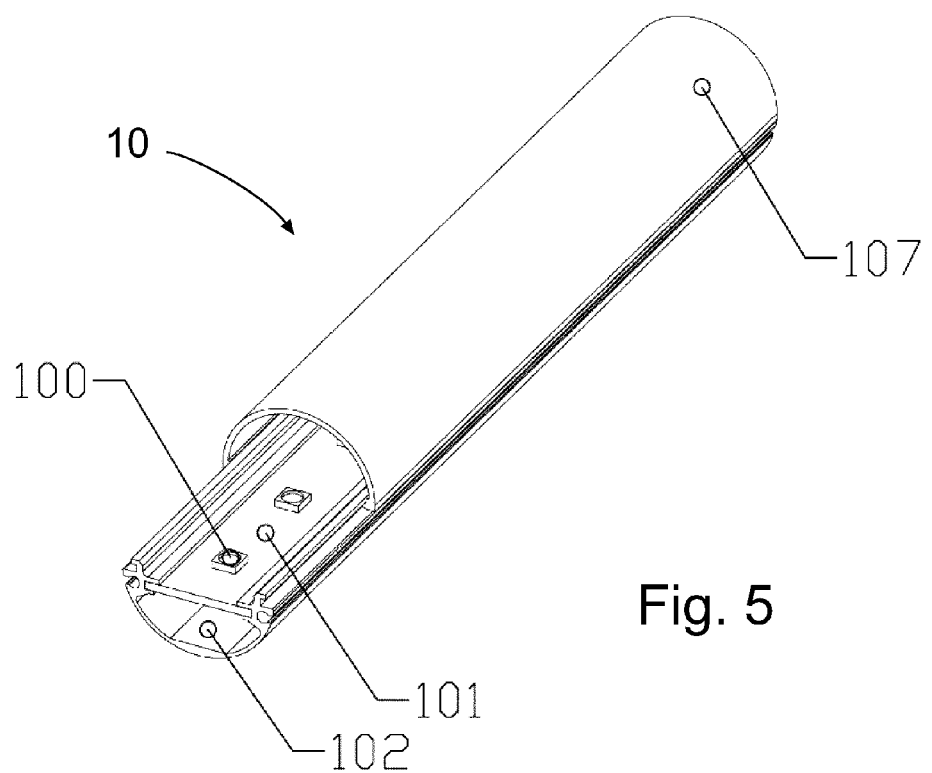
FIG. 5 is a 3-D view of another embodiment of a tube LED lighting system, without end fitting.

FIG. 5 shows another tube embodiment of the LED lighting system 10. The housing 102 in this embodiment has a tube shape with an unclosed half circle section, so a double-sided circuit board 101 can be installed on the housing 102 with edges of the circuit board 101 being received in inward facing slots of the housing 102. The cover lens 107 has same features as in FIG. 3.

FIG. 5 shows a rectangle embodiment of LED lighting system 10. The housing 102 is made of heat conductive and rigid materials. The circuit boards 101 with LEDs 100 are installed on the housing 102. Three rows of LEDs 100 are installed at different angles to provide wider viewing angle. The cover lens 107 is flat and installed on the housing 102. The whole assembly forms a rectangle. This lighting system can be applied in the recessed lighting applications.

Figure 6:
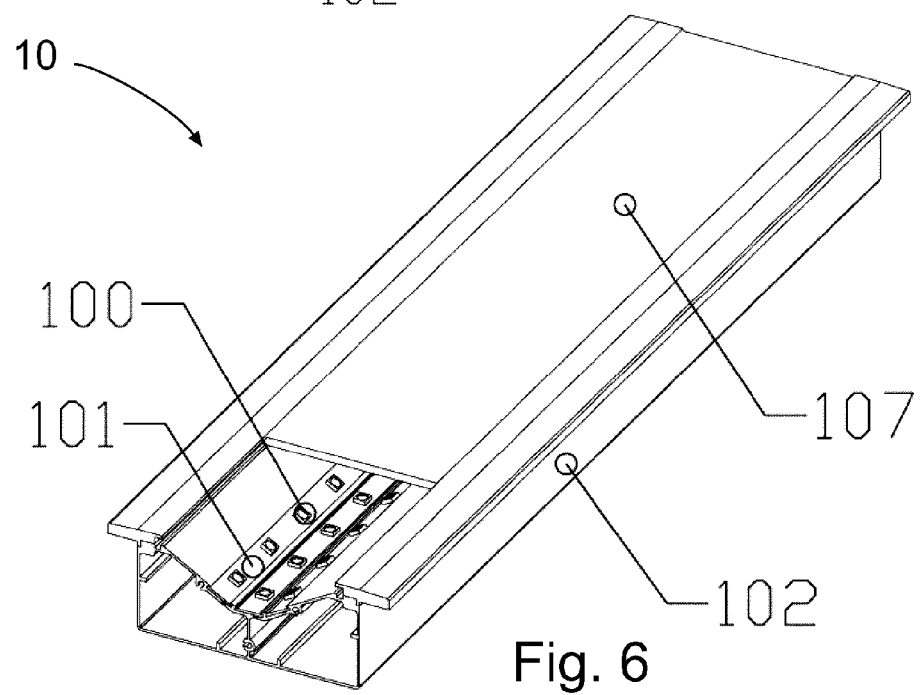
FIG. 6 is a 3-D view of a low profile LED lighting system, without end fitting.
Figure 7:
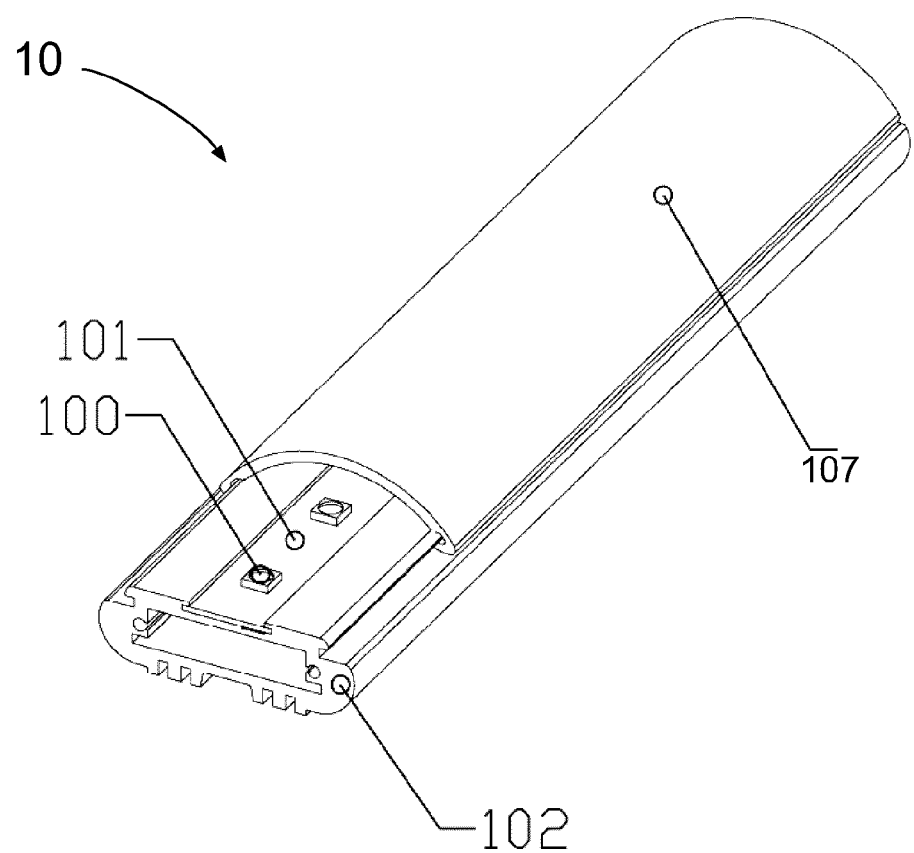
FIG. 7 is a 3-D view of a low-profile LED lighting system, with dome cover and without end fitting.

FIG. 6 shows an embodiment of an LED lighting system 10, with housing 102, cover lens 107 and with LEDs 100 secured to a circuit board 101. This system has low profile to fit into desired applications. In FIG. 6, the housing 102 has a base portion that is rectangular in section with a flat base and outer walls that are perpendicular to the flat base. A part of the housing connecting the outer walls above the flat base is recessed downward to receive the circuit boards 101 within the volume formed by the flat base and outer walls. The cover 107 in this example may be flat. In general, the configuration exemplified by FIG. 6 is that in cross-section, the walls of the housing form a polygon, that is not convex and may be open on a side, and the circuit boards are located on a recessed or concave portion of the housing. In this way, a low profile of housing may be obtained. In FIG. 7, domed cover 107 is provided, and the housing 102 holds a circuit board 101 with LEDs 100. The housings 102 in both FIGS. 6 and 7 each have a width and depth perpendicular to the long axis of the respective housings 102, and the width (intermediate axis) in each case is more than twice the depth (short axis), for example 3 or 4 times the depth. The LEDs in the system 10 as a group have a mean facing direction, defined by considering each LEDs own facing direction as a vector, summing the vectors and dividing by the number of LEDs. The mean facing direction of the LEDs may be perpendicular to the intermediate and long axes of the housing 102.

In various embodiments, the power control circuitry is formed on the circuit boards 101 that are carried by the various housings 102 (support structures) and are in electrical communication with the electrical connectors of the power sources 217. The circuit boards 102 support at least one array of LEDs 100. The at least one LED array may be divided into sets of LEDs. The power control circuitry may be formed of one or multiple current controllers, each of the one or multiple current controllers providing current control for a corresponding set of LEDs in the LED array. In some embodiments, sets of LEDs may be of the same or different colors, and the current control circuitry may provide same or different current control for a corresponding set of LEDs in the LED array according to the comparison result. The housings 102 may form channels. Each LED in the LED array may have in some embodiments a power rating of greater than 0.1 or 0.01 watt. The power control circuitry in some embodiments is provided by current control circuitry, for example onboard circuitry, carried by the support structure, in some embodiments within the channel, and may provide current control for individual sets of LEDs. The current control allows careful control of the forward current passing through the LED array so that it controls the brightness and heat production by the LEDs. Devices with a range of illumination field are disclosed, along with devices with LEDs having differently angled illumination fields. The housings 102 may have a front side on which the at least one LED array is carried and a rear side on which the power control circuitry is carried.

The pre-set conditions may be supplied to the power control circuitry by loading software or replacement or installation of hardware or both. The pre-set conditions may also be obtained by communication with external controllers, devices or equipment. The output control signal sent by the power control circuitry to the current control 202 may be used to cause the LEDs 100 to flash at selectable speeds. The output control signal may also comprise a code sent to an external controller (not shown) or monitoring system (not shown) for checking on the function of the power control circuitry, the input power 217 or response of the LEDs to control signals. That is, if the LEDs 100 or current control 202 are non-responsive to a control signal, then an error code may be sent by the power control circuitry to an external system to notify the external system of a problem. An output control signal sent to an external controller may also specify the comparison result and the nature of the instruction received from the input power, and this information may be used by external systems for control of other lighting systems in conjunction with the specific set of LEDs 100 being controlled by the power control circuitry.

Immaterial modifications may be made to the embodiments described here without departing from what is claimed.

What is claimed is:

1. An LED lighting system for connection to a variable power source providing input power, the variable power source being configured to represent a desired control setting with the input power by varying one or more characteristics of the input power, the LED lighting system comprising:
    a support structure spanning between a first end and a second end;
    at least one LED array extending along the support structure;
    power control circuitry for the at least one LED array, the power control circuitry being carried by the support structure and being in electrical communication with at least an electrical connector for connection to the variable power source; and
    the power control circuitry being configured to compare the input power to one or more pre-set conditions to yield a comparison result indicating the desired control setting represented by the input power and output a control signal according to the comparison result.

2. The LED lighting system of claim 1 in which the control signal is applied to a control circuit to control power provided to the at least one LED array according to the comparison result.

3. The LED lighting system of claim 2 further comprising:
    a circuit board supporting the at least one LED array;
    the at least one LED array being divided into one or more sets of LEDs; and
    the power control circuitry being formed of one or more current controllers, each of the one or multiple current controllers providing current control for a corresponding set of LEDs in the LED array.

4. The LED lighting system of claim 1 in which the power control circuitry is configured to change state upon a positive comparison result and output the control signal upon occurrence of the change of state.

5. The LED lighting system of claim 1 in which the one or more characteristics and the pre-set conditions are selected from voltage amplitude, power frequency and pulse width of the input power.

6. The LED lighting system of claim 1 in which, upon the occurrence of the comparison result, the power control circuitry is configured to send a dim signal to the at least one LED array.

7. An LED lighting system for connection to a variable power source providing input power, comprising:
    a support structure spanning between a first end and a second end;
    at least one LED array extending along the support structure;
    power control circuitry for the at least one LED array, the power control circuitry being carried by the support structure and being in electrical communication with at least an electrical connector for connection to the variable power source; and
    the power control circuitry being configured to compare the input power to one or more pre-set conditions to yield a comparison result and output a control signal according to the comparison result, in which the control signal is configured to instruct LEDs in the at least one LED array to flash.

8. An LED lighting system for connection to a variable power source providing input power, comprising:
    a support structure spanning between a first end and a second end;
    at least one LED array extending along the support structure;
    power control circuitry for the at least one LED array, the power control circuitry being carried by the support structure and being in electrical communication with at least an electrical connector for connection to the variable power source; and
    the power control circuitry being configured to compare the input power to one or more pre-set conditions to yield a comparison result and output a control signal according to the comparison result, in which the control signal comprises a check code.

9. A method of controlling an LED lighting system, comprising:
- providing an input power to the LED system using a variable power source;
- representing a desired control setting with the input power by varying one or more characteristics of the input power;
- comparing the input power to one or more pre-set conditions using power control circuitry to yield a comparison result indicating the desired control setting represented by the input power; and
- the power control circuitry outputting a control signal according to the comparison result.

10. The method of claim 9 in which the control signal is applied to a control circuit to control power provided to an array of LEDs according to the comparison result.

11. The method of claim 9 in which the one or more characteristics and the pre-set conditions are selected from voltage amplitude, power frequency and pulse width of the input power.

12. The method of claim 9 further comprising the power control circuitry changing state upon a positive comparison result and outputting a control signal upon occurrence of the change of state.

13. The method of claim 9 in which controlling current provided to the array of LEDs comprises controlling brightness of the LEDs.

14. The method of claim 13 in which controlling current provided to the array of LEDs comprises dimming the LEDs.

15. A method of controlling an LED lighting system, comprising:
- comparing input power to one or more pre-set conditions using power control circuitry to yield a comparison result; and
- the power control circuitry outputting a control signal according to the comparison result, in which the control signal instructs LEDs in the at least one LED array to flash.

16. A method of controlling an LED lighting system, comprising:
- comparing input power to one or more pre-set conditions using power control circuitry to yield a comparison result; and
- the power control circuitry outputting a control signal according to the comparison result, in which the control signal comprises a check code.

* * * * *

UNITED STATES PATENT AND TRADEMARK OFFICE
CERTIFICATE OF CORRECTION

PATENT NO. : 9,179,513 B2
APPLICATION NO. : 14/113208
DATED : November 3, 2015
INVENTOR(S) : X. Shan Page 1 of 1

It is certified that error appears in the above-identified patent and that said Letters Patent is hereby corrected as shown below:

Title Page

| COLUMN | LINE | ERROR |
|---|---|---|
| (30) Pg. 1, col. 1 | Foreign Application Priority Data | "Aug. 1, 2006 (CA) .... 255065" should read --Aug. 1, 2006 (CA) .... 2555065-- |

Signed and Sealed this
Twelfth Day of July, 2016

Michelle K. Lee
*Director of the United States Patent and Trademark Office*